Patented June 29, 1943

2,322,981

UNITED STATES PATENT OFFICE 2,322,981

CELLULOSE PRODUCT

Leo Ubbelohde, Berlin-Charlottenburg, Germany; vested in the Alien Property Custodian No Drawing. Application November 11, 1935, Serial No. 49,260. In Austria November 21, 1934

2 Claims. (Cl. 18—54)

The present invention relates to the production of improved products of cellulose such as artificial fibres, silk, ribbons, films, bristles, straw and the like from aqueous solutions of cellulose as for example viscose or cuprammoniumcellulose.

According to the present invention soluble substances are added to the aqueous spinning solution, containing cellulose which can be solidified after the product is formed either by condensation or polymerization with physical or chemical methods. A somewhat stiffer and more elastic structure is produced by this manner.

For example, a suitable quantity of a mixture of phenol and formaldehyde which may have been partly condensed but which is soluble in a viscose solution, is added to a solution of viscose produced in any well known manner. If the viscose is worked in the ripened state (i. e. with about 6 to 11 chlorammongrades according to Hottenroth) the solidifiable substances may be added before or during or even after the ripening process is performed, the addition may even be made during the manufacture of the xanthogenate or during the dissolving process. The quantity added may be varied within a wide range according to the effect which is to be produced, for example, from 0.1 to 20% of the quantity of cellulose in the viscose. The quantity of cellulose may vary from about 4 to 10% when using the wet spinning process and from about 15 to 25% when using the dry process of spinning viscose. The concentration of cellulose will be varied either when using cellulose of different viscosity, or when varying or even omitting the ripening process of the alkali-cellulose.

The solution thus prepared is formed into various cellulose products in the usual way and the phenol-formaldehyde incorporated therein is then condensed by applying heat to the product. The partial condensation of the phenol-formaldehyde before its addition is not absolutely necessary but will reduce the time necessary for the condensation of an insoluble substance and the mixture partially condensed will form bigger molecules which will not so easily be removable by diffusion during and after the forming and the aftertreatment of the products. Instead of mixtures of phenol-formaldehyde and mixtures of urea-formaldehyde, other substances may be used that may be rendered insoluble by heating or by a chemical treatment. Some of these substances solidify when treated with liquid or gaseous acids or other chemicals. Such substances are, for example, mixtures of urea, thiourea, phenol or aniline with aldehydes, especially formaldehyde in a polymerised state, or with ketones mixtures of polycarbonacids with aldehydes, especially formaldehyde in a polymerised state, or with ketones, amides or thioamides of polyamino-N-carbonacids, which means acids containing the group —NHCOOH or —NHCSOH or both, mixed with ketones or aldehydes, especially formaldehyde in a polymerised state. Amides of this kind, for example, include the following substances:

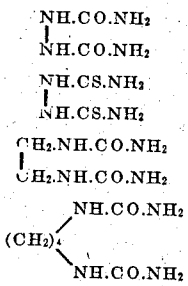

Further substances are, for example, mixtures of maleinic acid with aromatic hydrocarbons containing at least one saturated side-chain, either open, or formed in a ring. Polyvinylalcohol may also be mentioned and many other substances known from the chemical literature will work as well, if they are soluble in the spinning solution and solidifiable after forming the structure without destruction of the cellulose.

The subsequent hardening or conversion into the insoluble state of the substance incorporated in the product may, of course, be performed continually, for example, when producing filaments as rayon, staple fibre, ribbons, straw, bristles, tubes, films or the like by employing the hardening process before or during, or after the different states of forming, washing, aftertreating and drying of the products being performed in any well known manner. Certain substances added may be solidified as the formation of the structure takes place.

Examples (1) The manufacture of the cellulose products, for example, the manufacture of rayon, staple fibre or the like, according to this invention, is substantially the same as the known processes of spinning aqueous solutions of cellulose. The difference between the two is that according to the present invention, at a favorable state in the preparation of the cellulose-solution, the substances which can be hardened or rendered insoluble are incorporated therein. For example, a mixture of 50 parts of phenol and 50 parts of commercial quality formaldehyde and three parts of aqueous hydroxide of ammonium, which may be partially condensed before addition to the spinning solution, is added to the spinning solution in a quantity which may be varied, for example, between about 0.1 and 20% with respect to the content of cellulose in the cellulose-solution. The degree of partial condensation is limited by the point at which the substance resulting from condensation becomes insoluble in the spinning solution. The partially condensed mixture of phenol and formaldehyde is in the resole state, that is, it is in an initial state of condensation, and not in a final state of condensation. As a rule the partial condensation or polymerisation of the added substance will not be driven to this extent, the quantity of the added substance depending on the degree of elasticity or rigidness desired in the final product.

After forming the product and after or during the aftertreatment, it is treated in a way which will render the added substances insoluble and solid, as by a polymerizing or condensing treatment such as would similarly convert the added substances when not incorporated in the cellulose solution. Of course, a certain limitation is given to this treatment as the cellulose of the structure and the structure itself must not be damaged or destroyed by this treatment. For example, when using a mixture of phenol, urea or thiourea with formaldehyde the product is heated to a temperature of about 90 to 150° C. for a period varying from a few minutes to 8 hours as the circumstances may require.

(2) When making a solution of viscose, containing 4.5 to 8% of cellulose and 4 to 8% of NaOH, 4% of an alkaline solution of a condensation product of thiourea and formaldehyde (not separated from the water this solution contains normally) is added or a similar synthetic resin-like substance which is solidified slowly when in contact with an acid solution, especially with a solution of mineral acid. The viscose thus prepared is filtered and freed from air bubbles and then spun either in the ripened state, or preferably in the unripened state in using, for example, a spinning bath containing 160 g. $H_2SO_4$-monohydrate and 240 g. of Glauber salt in 1 liter. As the solidification of the added mixture of urea and formaldehyde under the influence of the electrolytes in the spinning bath is but slowly performed, the mixture of the condensing substances, the quantity added and the concentration of electrolytes in the spinning bath may be chosen so as to influence the desired solidification of the added substances. A further process of condensation or polymerization is not necessary.

Instead of the aqueous spinning substances mentioned in the examples given hereinbefore any other aqueous substances as for example cuprammoniumcellulose or the known derivatives of cellulosexanthogenat may be used as well as other substances to be solidified.

Having now described my invention and the way in which it is to be performed that what I claim is:

1. A method of producing an improved product of cellulose which comprises admixing an aqueous cellulosic solution and a solution containing urea and formaldehyde, forming the cellulosic product which has incorporated therein the urea and formaldehyde, and converting the urea and formaldehyde into a solidified state while within the product.

2. In the method of claim 1 converting the urea and formaldehyde into a solidified state by heating the product after its formation.

LEO UBBELOHDE.